United States Patent [19]

Runge et al.

[11] 3,716,756

[45] Feb. 13, 1973

[54] RECYCLE PREVENTION CONTROL CIRCUIT

[75] Inventors: John N. Runge; Kenneth R. Krusling, both of Cincinnati, Ohio

[73] Assignee: R K Electric Co., Inc., Cincinnati, Ohio

[22] Filed: March 3, 1972

[21] Appl. No.: 231,668

[52] U.S. Cl...........317/13 A, 317/36 TD, 317/141 S, 318/484
[51] Int. Cl............................................H02h 7/085
[58] Field of Search.............317/13 A, 36 TD, 141 S; 318/484

[56] References Cited

UNITED STATES PATENTS

| | | | |
|---|---|---|---|
| 3,434,028 | 3/1969 | McCready | 318/484 |
| 3,498,228 | 3/1970 | Blumle et al. | 318/484 |
| 3,660,718 | 5/1972 | Pinckaers | 317/13 B |

Primary Examiner—James D. Trammell
Attorney—John W. Melville et al.

[57] ABSTRACT

Timed control for preventing recycling of an electric motor drive compressor after a power interruption. It includes a solid-state pre-set time delay circuit which, upon timing out, closes normally open contacts to permit energization of the motor driven compressor. A latching circuit automatically locks in the power supply to the motor driven compressor and deenergizes the time delay circuit until power is interrupted.

8 Claims, 1 Drawing Figure

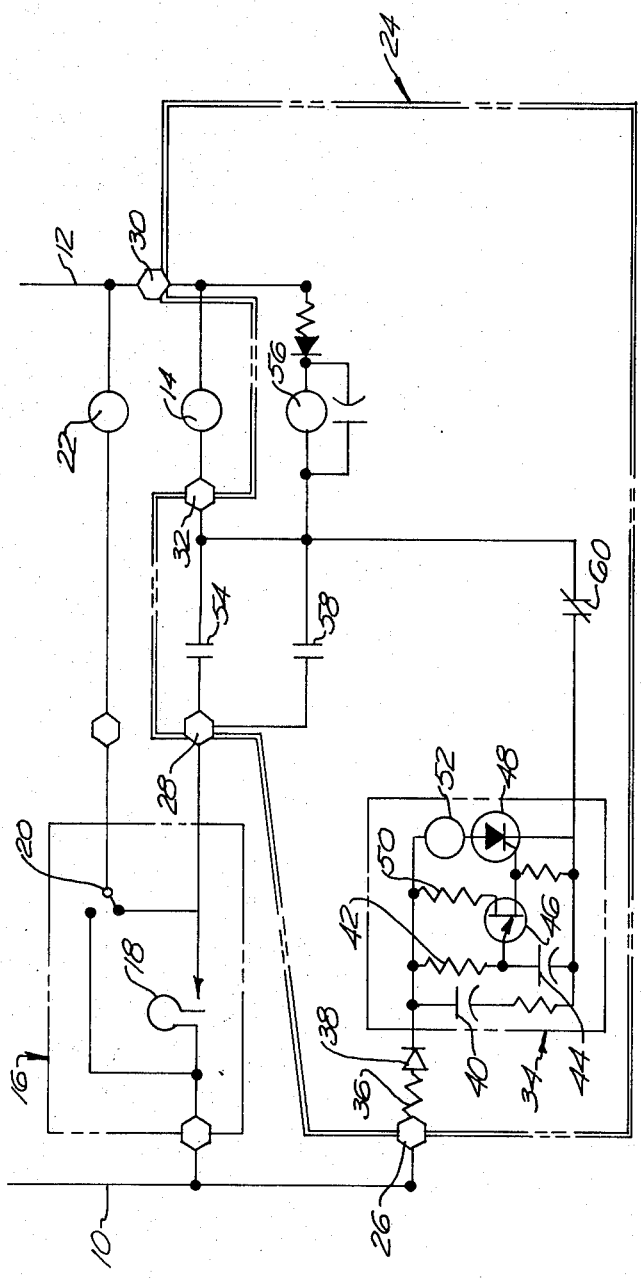

RECYCLE PREVENTION CONTROL CIRCUIT

BACKGROUND OF THE INVENTION

This invention relates to a recycle preventing control circuit, and particularly to a time control circuit for preventing recycling of an electric motor driven compressor after a power interruption.

The invention has great and particular utility in connection with home air conditioning units. Such units of course include an electric motor driven compressor which is actuated in response to a thermostatically controlled switch. Upon closing of the thermostatically controlled switch, power will be delivered to an electric motor which drives the compressor.

Upon any interruption in the power supply, the motor is deenergized. When the power supply is resumed, the motor will once again be energized. However, if the resumption of power occurs very shortly after the interruption, there will be considerable pressure in the compressor system, and the motor must start the compressor under a very heavy load. These conditions lead to rapid burn-out of the motor itself.

Power interruptions can occur in a variety of ways. First of all, during the course of the summer months when air conditioning is in almost constant use, thunderstorms are quite common. Electrical disturbances caused by such storms will very frequently result in a momentary power interruption. These momentary interruptions, as indicated above, are extremely hard on the electric motor of an air conditioning unit.

Secondly, similar power interruptions can occur upon manual actuation of the thermostat control. In other words, a housewife or home owner will vary the setting of the thermostat. It is very easy for such variations to effect a manual, but momentary interruption of the power supply to the motor driven compressor.

Keeping the foregoing comments in mind, it is a primary object of this invention to provide a solid-state control circuit which will positively prevent recycling of a motor driven compressor after a power interruption until the residual pressure in the compressor system has been reduced.

It is a further object of this invention to provide such a control circuit which includes a time delay circuit having a preset delay period. It is a further specific object of this invention to provide such a time delay circuit which will automatically be reset immediately upon energization of the motor driven compressor.

Still a further object of the invention is to provide such a control circuit which can conveniently be incorporated in connection with existing equipment.

Still a further object of the invention is the provision of a timed control circuit which utilizes solid-state components, and hence is substantially maintenance-free over its full, normal life.

SUMMARY OF THE INVENTION

Broadly considered, this invention relates to a timed control circuit for preventing recycling of an electric motor driven compressor for a predetermined period after a power interruption. The circuit includes a solid-state time delay circuit which is energized as soon as power is supplied. Once this circuit times out, normally open contacts connected in series with the compressor motor contacts are closed. This permits the motor to start in response to the thermostat. Once the motor is energized, a latching circuit locks in the power supply to the compressor motor contacts and deenergizes the time delay circuit.

An interruption of the power supply for any reason will of course deenergize the latch circuit to break electrical connection with the compressor motor contacts. Upon resumption of the power supply, the time delay circuit is again energized. The compressor motor contacts cannot be energized until the time delay circuit times out and the normally open contacts connected with the compressor motor contacts are again closed.

BRIEF DESCRIPTION OF THE DRAWINGS

The single FIGURE accompanying this application is a schematic electrical diagram illustrating the circuitry of this invention as connected to a portion of a conventional control circuit for energizing a motor driven compressor.

DESCRIPTION OF THE PREFERRED EMBODIMENT

The device of this invention is adapted to be connected to the existing or conventional control circuitry of, for example, an air conditioning system. A 24 volt AC power supply will be connected to the lines 10 and 12. The relay coil for actuating the compressor motor is indicated at 14. A conventional thermostat is indicated generally at 16. This thermostat will include, among other things, the heat sensitive switch 18. Under normal circumstances, at a preset temperature, the switch 18 will close supplying power to the compressor coil 14 thereby energizing the electric motor which drives the compressor. The thermostat may also include a switch 20 which is effective to energize a fan motor relay coil 22. These components are conventional and do not, per se, form a part of this invention.

The control circuit of this invention is outlined by the double line indicated at 24. It is connected to the power supply line 10 at 26 and 28. It will be observed that the point 28 is of course connected too the power line 10 across the thermostatically controlled switch 18. The circuit of this invention is connected to the power line 12 at 30. The device of this invention is also connected across the compressor relay coil 14 at 30 and 32.

The control circuit of this invention includes the preset, solid-state time delay circuit indicated generally at 34. This circuit is connected to the terminal 26 across the resistor 36 and diode 38. A capacitor 40 may be employed in the circuit as a filter. The time delay of the circuit is determined by the values of the timing resistor 42 and the timing capacitor 44. Connected between these components is the unijunction 46. When the capacitor 44 has been charged, a given voltage will be applied to the unijunction, causing it to deliver an electrical pulse to the scr 48. The biasing resistor 50 is of course conventional and necessary to make the unijunction operate in the desired manner.

Triggering or firing of the scr 48 will permit current to pass through the low amperage time delay relay 52, thereby closing the normally open time delay contacts 54. This of course closes the circuit between the terminals 28 and 32, and permits operation of the compressor relay 14 in response to closing of the thermostat switch 18.

In other words, when the thermostat switch 18 is closed, full control voltage potential will be applied across the terminals 32 and 30, energizing the compressor relay 14 and starting the compressor motor.

Closing of the thermostat switch 18 will also put full control voltage across the latching relay coil 56, energizing it. Energization of the latching relay coil 56 is effective to close the normally open latching relay contacts 58 and to open the normally closed latching relay contacts 60. The closing of the latching relay contacts 58 is effective to maintain the electrical connection between the terminals 28 and 32. The opening of the latching relay contacts 60 will deenergize the time delay circuit 34, thus dropping out the time delay relay coil 52 and reopening the time delay relay contacts 54. In other words, the time delay circuit 34 will be reset.

In the event there is an interruption in the power supply, the latching relay coil 56 will be deenergized, and the latching relay contact 58 will be opened. In the event this power interruption is momentary, such that within a period of five minutes or less power is again applied across the terminals 28 and 30, the open time delay contacts 54 will prevent energization of the compressor relay coil 14. The resumption of power will again energize the time delay circuit 34; after it has timed out as explained earlier, these contacts 54 will close and the compressor relay coil 14 can then be energized.

It is believed that the foregoing constitutes a full and complete disclosure of this invention. It very effectively prevents recycling of the compressor relay coil 14 for a predetermined time period sufficient to allow residual pressure in the compressor system to dissipate. This of course prevents the necessity of starting the electric motor driven compressor under a load, and virtually eliminates the motor burn-out caused by repeated starting under load.

No limitations are intended except insofar as specifically set forth in the claims which follow.

The embodiments of the invention in which an exclusive property or privilege is claimed are defined as follows:

1. A control circuit for preventing restarting of electrical apparatus for a preset time after a power interruption comprising:
   a. first normally open electrical contacts effective when closed to connect said electrical apparatus to a power supply;
   b. second normally open contacts effective when closed to connect said electrical apparatus to said power supply, said second normally open contacts being connected in parallel to said first normally open contacts;
   c. first electrical means for closing said first normally open contacts;
   d. preset time delay circuit means connected to said power supply and effective upon timing out to energize said first electrical means whereby to close said first normally open contacts after said preset time delay;
   e. second electrical means connected to said power supply for closing said second normally open contacts only after said first normally open contacts have been closed; and
   f. means for opening said first normally open contacts to reset said time delay circuit as said second normally open contacts are closed.

2. The control circuit claimed in claim 1 wherein said means for opening said first normally open contacts and resetting said time delay circuit is responsive to said second electrical means.

3. The control circuit claimed in claim 2 wherein said means for opening said first normally open contacts and resetting said time delay circuit includes normally closed contacts arranged to be opened by said second electrical means.

4. The control circuit claimed in claim 1 including a thermostatically controlled switch connected between said power supply and said first and second normally open contacts.

5. The control circuit claimed in claim 1 wherein said first and second electrical means are of relative sizes such that the current effective to energize said first electrical means will not energize said second electrical means.

6. The control circuit claimed in claim 1 wherein said time delay circuit includes an scr connected in series with said first electrical means, triggering of said scr being effective to energize said first electrical means.

7. The control circuit claimed in claim 1 wherein said time delay circuit includes a timing resistor, a unijunction, and a timing capacitor connected in series, the output pulse of said unijunction being effective to trigger said scr.

8. In an air conditioning system having a motor driven compressor and an electrical control circuit having a thermostatically controlled switch and electrically actuated means for controlling energization of said motor, the improved circuit for preventing restarting of said motor for a preset period after an interruption of power to said electrically actuated means comprising:
   a. a preset time delay circuit connected to said control circuit and arranged to begin its cycle upon energization of said control circuit;
   b. electric relay means normally preventing electrical connection between said control circuit and said electrically actuated means for controlling energization of said motor, said relay means being energized by said time delay circuit to effect electrical connection between said control circuit and said electrically actuated means for controlling energization of said motor upon timing out of said time delay circuit; and
   c. means for resetting said time delay circuit and deenergizing said relay means upon closing of said thermostatically actuated switch and actuation of said means for controlling energization of said motor.

* * * * *